(No Model.) 2 Sheets—Sheet 1.

J. F. APPLEBY.
KNOTTING APPARATUS FOR GRAIN BINDERS.

No. 352,602. Patented Nov. 16, 1886.

Witnesses:
Geo. W. Miatt
R. C. Howes

Inventor:
John F. Appleby
Per Eadio E. Quimby
Atty.

(No Model.) 2 Sheets—Sheet 2.

J. F. APPLEBY.
KNOTTING APPARATUS FOR GRAIN BINDERS.

No. 352,602. Patented Nov. 16, 1886.

UNITED STATES PATENT OFFICE.

JOHN F. APPLEBY, OF MINNEAPOLIS, MINNESOTA, ASSIGNOR TO THE MINNEAPOLIS HARVESTER WORKS, OF SAME PLACE.

KNOTTING APPARATUS FOR GRAIN-BINDERS.

SPECIFICATION forming part of Letters Patent No. 352,602, dated November 16, 1886.

Application filed April 21, 1886. Serial No. 199,602. (No model.)

*To all whom it may concern:*

Be it known that I, JOHN F. APPLEBY, of Minneapolis, Minnesota, have invented a certain Improvement in Knotting Apparatus for Grain-Binders, of which the following is a specification.

This improvement relates to the type of knotting apparatus in which the rotating knotter-shaft is journaled in a swinging frame; and the invention embraces three special features: First, the combination, with such a swinging frame, of the swinging tucker-arm carrying the pawl for impelling the cord-holder disk, and means for rocking the swinging knotter-shaft frame and the tucker and pawl-carrying arm, respectively, toward and from each other at appropriate stages of the knotting operation; secondly, the provision of a cord-guiding hook which is affixed to and moves with the swinging knotter-shaft frame on the side thereof toward the cord-holder, and which, during the operation of forming the loop upon the knotting-bill, serves to hold the cord extending from the knotting-bill to the cord-holder away from a fixed knife, which is between the hook and the cord-holder, and which, after the formation of the knot, pulls the binding-cord against the knife, and thus assists in severing it.

The third feature of the invention consists in mounting upon a common pivot the swinging knotter-shaft frame and the swinging tucker carrying the pawl for impelling the cord-holder disk.

Figure 1:
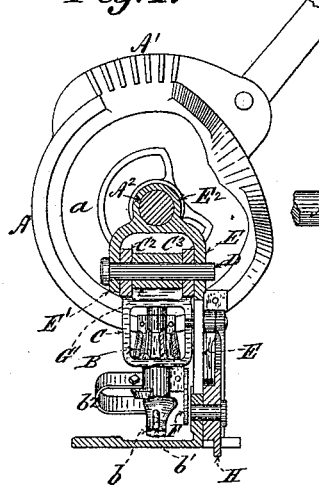
Figure 2:
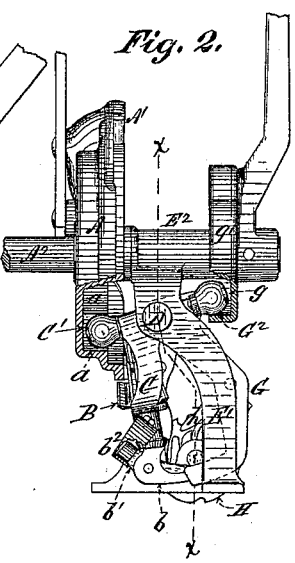
Figure 3:
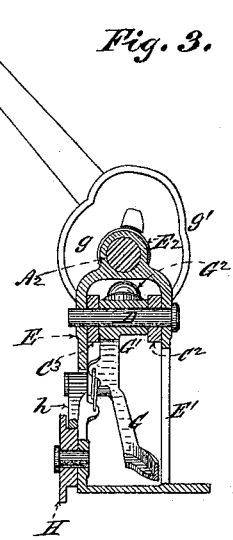
Figure 4:
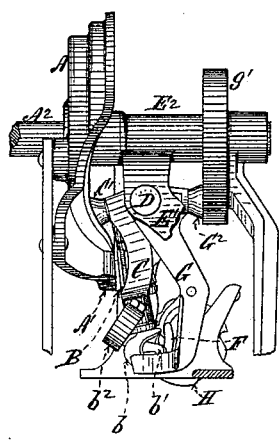
Figure 5:
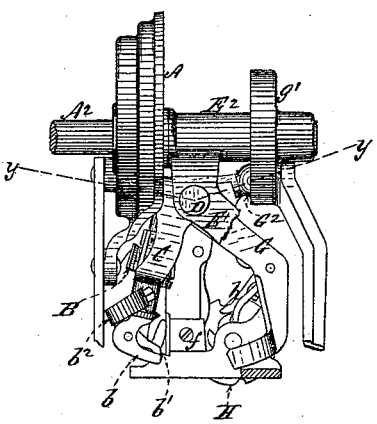
Figure 6:
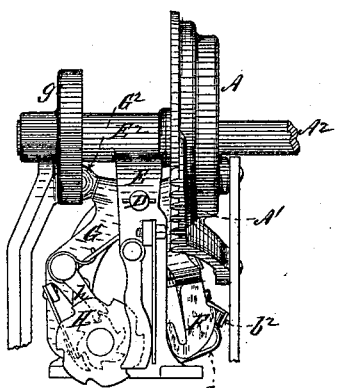
Figure 7:
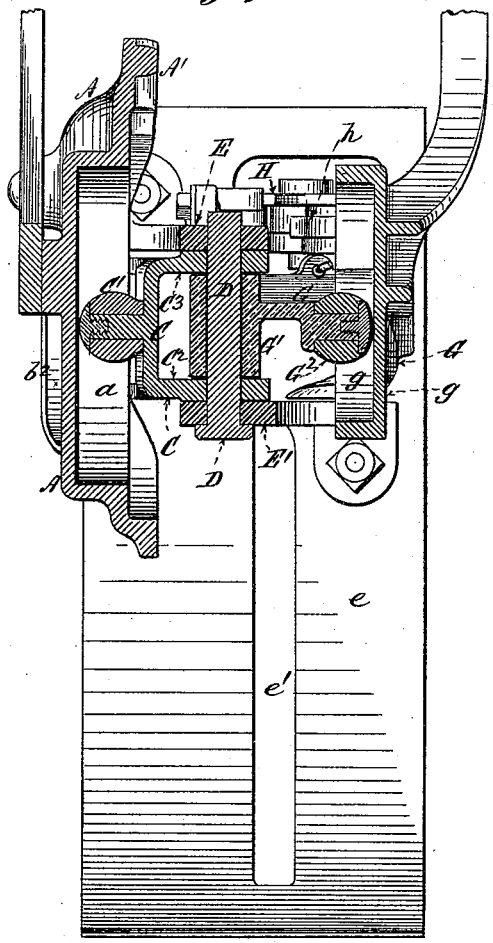

The accompanying drawings of knotting apparatus embodying the improvements are as follows:

Figure 1 is a vertical section through the offset dotted line *x x* on Fig. 2, affording a view in elevation of the knotter-operating wheel. Fig. 2 is an elevation, partly in section, of the knotting apparatus. Fig. 3 is a vertical section through the offset dotted line, affording a view in elevation of the grooved face of the cam for operating the tucker, and the pawl for impelling the disk of the cord-gripper. Figs. 4 and 5 are elevations of the stubble side of the knotting apparatus, in each of which a portion of the bracket which supports the shield is represented as broken away, and which respectively show the swinging frame in which the knotter-shaft is mounted and the tucker-arm in two different positions. Fig. 6 is an elevation of the stubble side of the apparatus, representing the parts in the positions in which they are represented in Fig. 5. Fig. 7 is a horizontal section through the dotted line *y y* on Fig. 5.

In the knotting apparatus represented in the drawings the knotter-operating wheel A is provided with the segmental gear A', for engaging the knotter-shaft pinion B, and thereby rotating the knotter-bill to form the loop. The knotter-shaft is mounted in the swinging frame C, which is provided at its upper end, upon the side toward the knotter-operating wheel A, with a laterally-projecting stud carrying the anti-friction roller C'. The cam-groove *a* in the face of the knotter-operating wheel A, by engaging the roller C', imparts the required to-and-fro swinging movement to the frame C. On the side opposite to that carrying the roller C' the frame C, at its upper end, is provided with the laterally-projecting ears $C^2$ and $C^3$, which are perforated to receive the pivot D, upon which the frame C rocks. The pivot D is inserted through appropriate perforations in the standards E E', which are cast in one piece with the sleeve $E^2$, through which the knotter-wheel shaft $A^2$ extends. The lower ends of the standards E E' are bolted to the shield-plate *e*, provided with the usual slot, *e'*, through which the cord-arm works.

The knotter-bill consists of the usual hook, *b*, and the pivoted jaw *b'*, which, during the operation of forming the loop, is held down against the hook *b* in the usual manner by the spring $b^2$, which is fastened to the swinging frame.

A cord-guiding hook, F, is affixed to the side of the swinging frame C, near its lower end, and performs the double function of holding the binding-cord clear of the knife *f* while the loop is being formed, and assisting in severing the binding-cord by pulling the cord against the edge of the knife *f* when the swinging frame C is swung backward for the purpose of stripping the knot from the knotter-bill.

The tucker-arm G is provided at its upper end with the perforated hub G′, by means of which it is hung on the pivot D. A short arm projecting laterally from the upper end of the tucker-arm G carries the anti-friction roller $G^2$, which is engaged by the cam-groove $g$ in the face of the cam-wheel $g'$, affixed to the prime shaft $A^2$.

By means of the cam-grooves $a$ and $g$ engaging, respectively, the rollers C′ and $G^2$ the knotter-shaft frame C and the tucker-arm G are rocked toward and from each other at appropriate stages of the knotting operation.

The pawl $h$, for impelling the cord-holder disk H, is pivoted to the side of the tucker-arm G, and the cam-groove $g$ thus performs the additional function of giving the necessary motion for operating the cord-holder disk H.

What is claimed as the invention is—

1. In knotting apparatus for grain-binders, the combination, as herein set forth, of a cord-holder, a swinging tucker-arm carrying the pawl for impelling the cord-holder disk, a swinging frame carrying the rotating knotter-shaft, and means for rocking the tucker and pawl-carrying arm and the knotter-shaft frame toward and from each other at appropriate stages of the knotting operation.

2. The knotter-shaft frame C, the tucker and pawl-carrying arm G, the pivot D, serving as a common axis for the frame C, and the arm G, a cord-holder, and means for imparting swinging movements toward and from each other to the frame C, and the tucker and pawl-carrying arm G at appropriate stages of the knotting operation.

3. The cord-guiding hook F, mounted upon the swinging frame C, in combination with the knotting-bill and cord-holder, and the stationary knife F, as and for the purposes set forth.

JOHN F. APPLEBY.

Witnesses:
C. M. CASTLE,
R. D. JONES.